United States Patent [19]

Wu

[11] Patent Number: 5,497,528
[45] Date of Patent: Mar. 12, 1996

[54] WINDSHIELD WIPER WITH SLIP JOINT FOR PIVOTING OF ARM ASSEMBLIES

[76] Inventor: Wu-Shuan Wu, No. 3, Alley 1, Lane 28, Hou-Kang 1st Rd., Hsin-Chuang City, Taipei County, Taiwan

[21] Appl. No.: 506,474

[22] Filed: Jul. 25, 1995

[51] Int. Cl.⁶ .................. B60S 1/38; B60S 1/28
[52] U.S. Cl. .................. 15/250.46; 15/250.41; 15/250.31; 15/250.44; 403/61; 403/82
[58] Field of Search .............. 15/250.41, 250.46, 15/250.44, 250.33, 250.48, 250.31, 250.47; 403/24, 79, 363, 61, 82, 53, 59

[56] References Cited

U.S. PATENT DOCUMENTS

| | | | |
|---|---|---|---|
| 2,596,063 | 5/1952 | Anderson | 403/61 |
| 3,405,421 | 10/1968 | Tomlin | 15/250.33 |
| 4,009,504 | 3/1977 | Arman | 15/250.46 |
| 4,287,634 | 9/1981 | Speth | 15/250.46 |
| 5,325,563 | 7/1994 | Cayan | 15/250.46 |

FOREIGN PATENT DOCUMENTS

| | | | |
|---|---|---|---|
| 588711 | 3/1994 | European Pat. Off. | 15/250.46 |
| 2398645 | 3/1979 | France | 15/250.33 |

*Primary Examiner*—Gary K. Graham
*Attorney, Agent, or Firm*—Morton J. Rosenberg; David I. Klein

[57] ABSTRACT

A windshield wiper of the type including an arm holder, a blade holder, a rubber blade fixed to the blade holder, two symmetrical arm assemblies having a respective coupling portion in the middle respectively turned about a respective pivot at each end of the arm holder to hold the blade holder, wherein the coupling portion of each arm assembly has two vertical oblong holes aligned at two opposite sides and connected to one pivot of the arm holder; two friction plates are respectively turned about the pivots of the arm holder and connected between the arm holder and the arm assemblies and bridging the coupling portion of each arm assembly, each friction plate having two vertical oblong holes respectively connected one pivot of the arm holder and attached to the vertical oblong holes of the coupling portion of one arm assembly at two opposite sides, and two opposite inside flanges raised around the vertical oblong holes of the respective friction plate and fitted into the vertical oblong holes of the coupling portion of one arm assembly.

1 Claim, 6 Drawing Sheets

5,497,528

WINDSHIELD WIPER WITH SLIP JOINT FOR PIVOTING OF ARM ASSEMBLIES

BACKGROUND OF THE INVENTION

The present invention relates to windshield wipers, and relates more particularly to an improved structure of windshield which absorbs the reaction force from the rubber blade when operated to wipe off rain from the windshield.

A variety of windshield wipers have been disclosed for wiping off rain, snow, etc., from the windshield, and have appeared on the market. FIGS. 5 and 6 show a windshield wiper according to the prior art, which is comprised of an arm holder (7), a blade holder (9) having three longitudinal clamping walls (91), two rubber BLADES (92) fixed to the two longitudinal grooves defined in the clamping walls (91) of the blade holder (9), two symmetrical arm (71) pivotably connected to each end of the arm holder (7), and two auxiliary arms (8) pivotably connected to each arm (71) and having two arched coupling portions (81) at two opposite ends coupled to a top coupling-portion 82 on the blade holder (9). The arm (71) has one end pivoted to one auxiliary arm (8), and an opposite end terminating in a coupling portion (72) coupled to one end of the blade holder (9). When the windshield wiper is reciprocated to rub the rubber blades (92) over the windshield, as shown in FIGS. 6-A and 6-B, a reaction force is produced from the rubber blades (92) and transmitted to the auxiliary arms (8) and the arms (71). When the arm holder 7 is moved to change the wiping direction of the rubber blades (92), the rubber blades (92) tend to be twisted. When the rubber blades (92) are twisted, they cannot be moved over the windshield smoothly.

SUMMARY OF THE INVENTION

The present invention has been accomplished to provide a windshield wiper which eliminates the aforesaid problems. It is one object of the present invention to provide a windshield wiper which eliminates the reaction force from the rubber blade during the operation. It is another object of the present invention to provide a windshield wiper which keeps the rubber blade closely attached to the windshield when operated to reciprocate the rubber blade.

The aforesaid objects are achieved by attaching a friction plate to each arm and connecting each arm and the respective friction plate to each end of the arm holder through a slip joint.

BRIEF DESCRIPTION OF THE DRAWINGS

FIG. 3-A is similar to FIG. 3 but showing the rubber blade moved leftwards over the windshield;

FIG. 3-B is similar to FIG. 3 but showing the rubber blade moved rightwards over the windshield;

FIG. 6-A is similar to FIG. 6 but showing the rubber blade moved leftwards over the windshield; and FIG. 6-B is similar to FIG. 6 but showing the rubber blade moved rightwards over the windshield.

DETAILED DESCRIPTION OF THE PREFERRED EMBODIMENT

Figure 1:
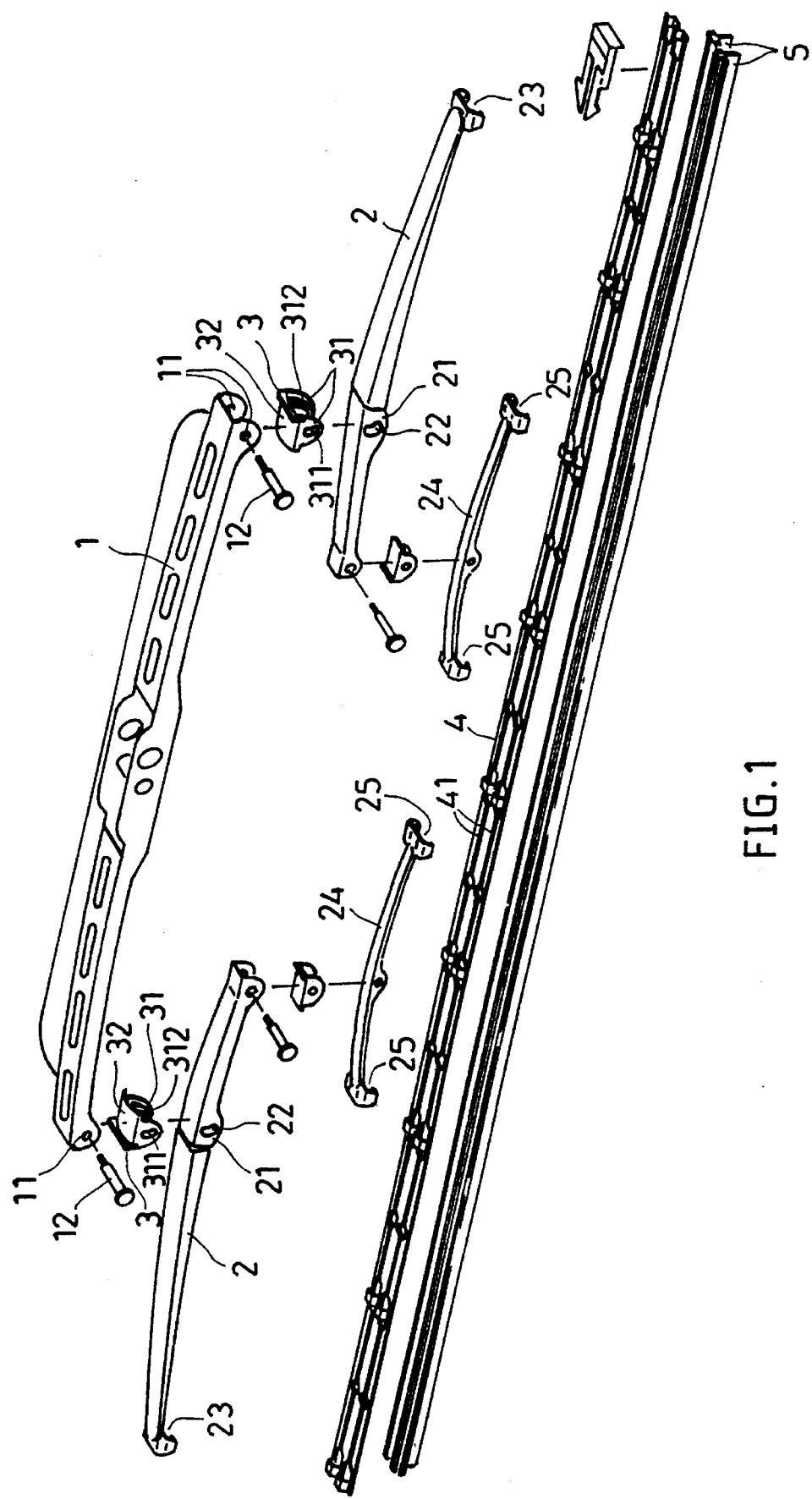
FIG. 1 is an exploded view of a windshield wiper according to the present invention.
Figure 2:
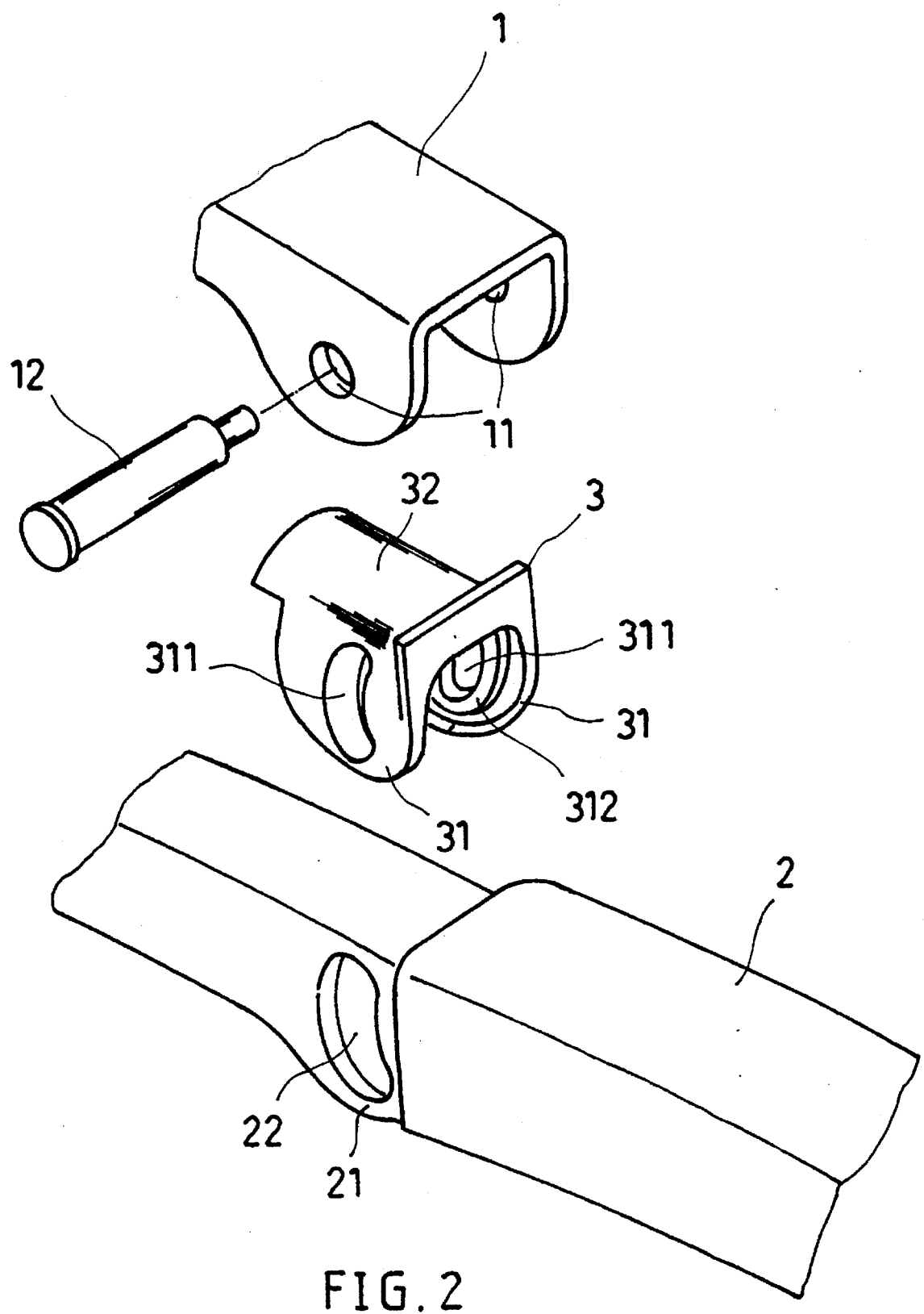
FIG. 2 is an enlarged view taken on a part of FIG. 1 showing the position of the friction plate relative to the arm holder and the arm.

Referring to FIGS. 1, 2, 3, and 4, a windshield wiper in accordance with the present invention is generally comprised of an arm holder 1, a blade holder 4, a rubber blade fixed to the blade holder 4, and two symmetrical arms 2 pivotably connected to two opposite ends of the arm holder 1 to hold the blade holder 4. The arm 2 has one end pivotably coupled with an auxiliary arm 24, which has two clamping portions 25 at two opposite ends clamped on two longitudinal ribs 41 of the blade holder 4, an opposite end terminating in a clamping portion 23 clamped on the longitudinal ribs 41 of the blade holder 4 at one end, and two downward lugs 21 bilaterally disposed in the middle and pivotably connected to one end of the arm holder 1 through a slip joint, each downward lug 21 having a vertical oblong hole 22. The arm holder 1 has two opposite pairs of pivot holes 11 at two opposite ends respectively connected to the downward lugs 21 of each arm 2 by a respective pivot pin 12 and a respective U-shaped friction plate 3 to thus allow pivoting and swinging of the each arm 2. The friction plate 3 comprises a top coupling wall 32 bridging one arm 2, two opposite side coupling walls 31 respectively extended from two opposite sides of the top coupling wall 32 and fitting over the downward lugs 21 of the respective arm 2, vertical oblong holes 311 respectively connected to the vertical oblong holes 22 of the downward lugs 22 of the respective arm 2 and the pivot holes 11 at one end of the arm holder 1 by a pivot 12, and two opposite inside flanges 312 respectively raised from the inside wall around each vertical oblong hole 311 and fitted into the vertical oblong holes 22 of the downward lugs 21 of the respective arm 2.

Figure 3:
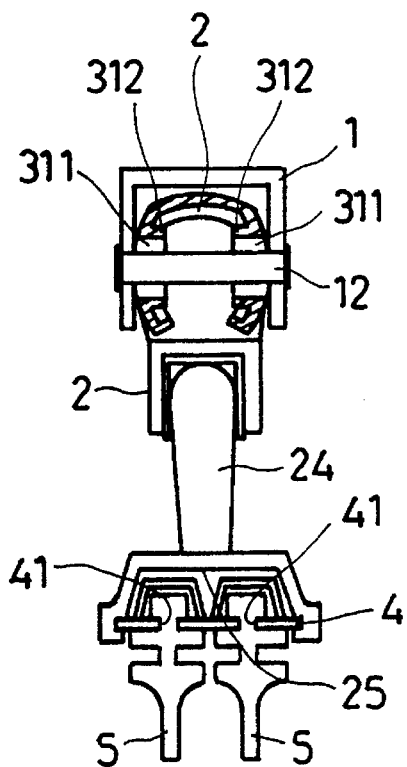
FIG. 3 is a cross sectional view of the windshield wiper shown in FIG. 1 when not operated.
Figure 3A:
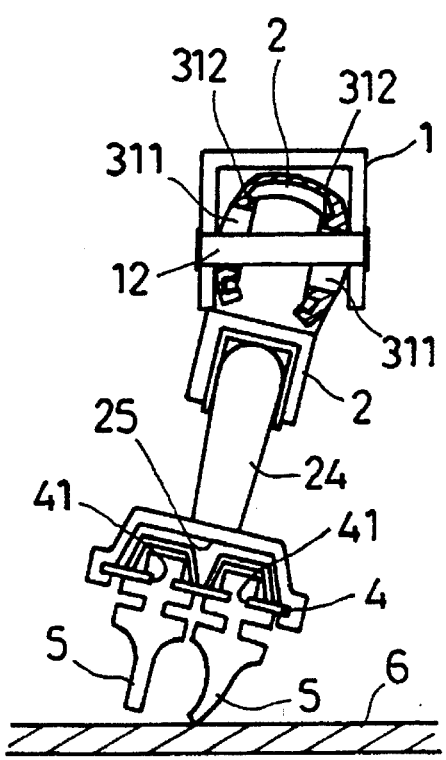
Figure 3B:
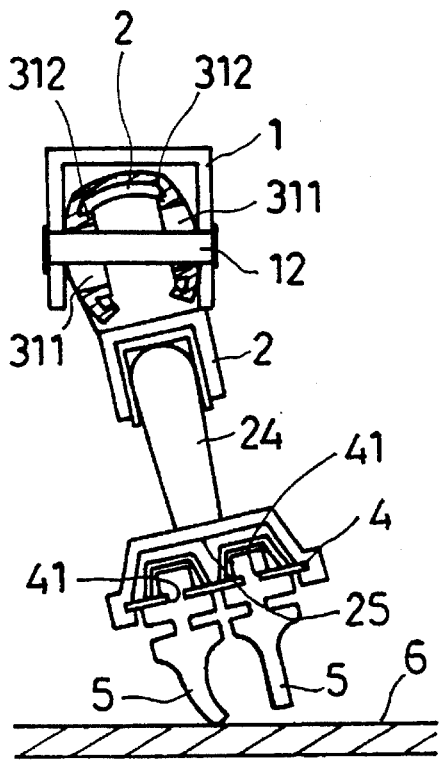
Figure 4:
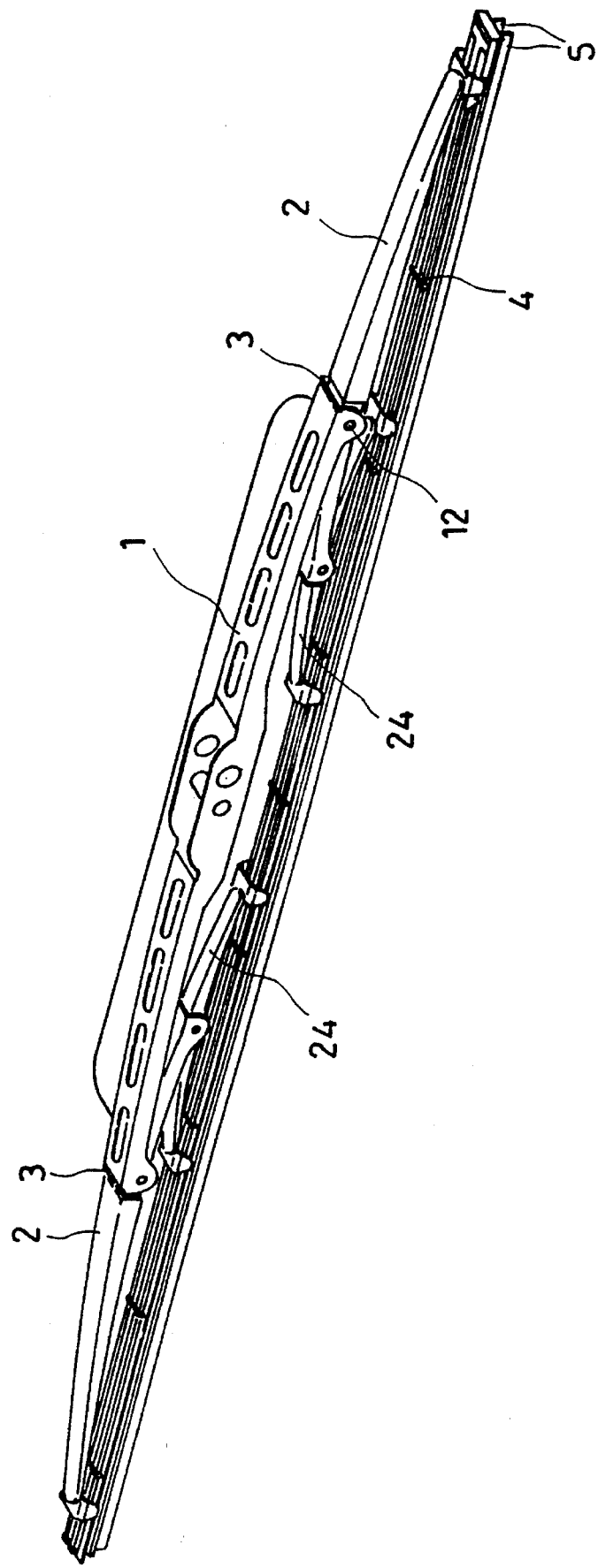
FIG. 4 is an elevational view of the windshield wiper according to the present invention.
Figure 5:
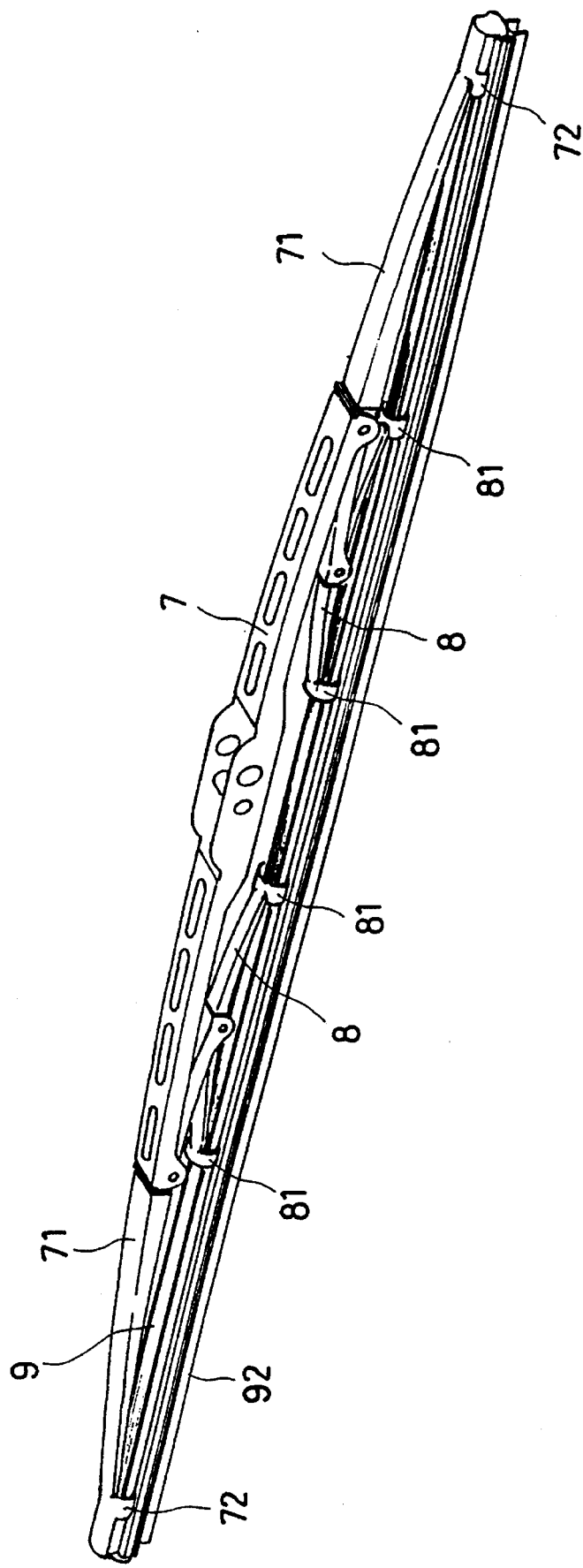
FIG. 5 is an elevational view of a windshield wiper according to the prior art.
Figure 6:
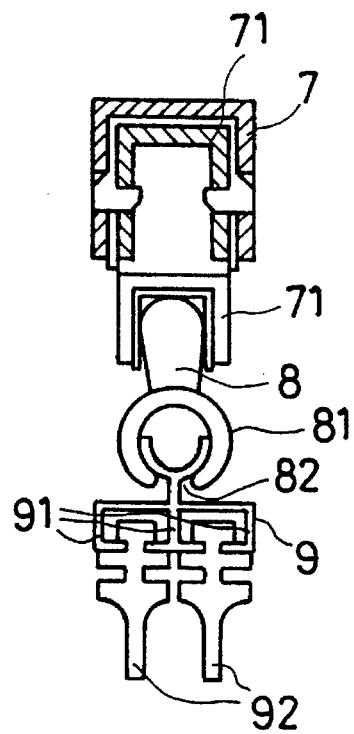
FIG. 6 is a cross sectional view of the windshield wiper shown in FIG. 5.
Figure 6A:
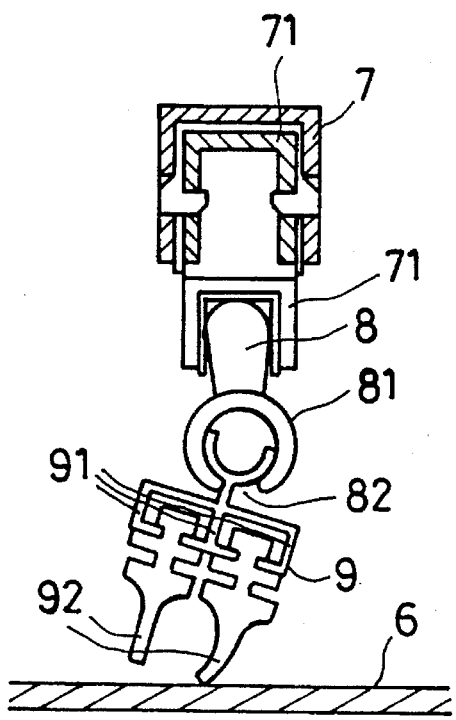
Figure 6B:
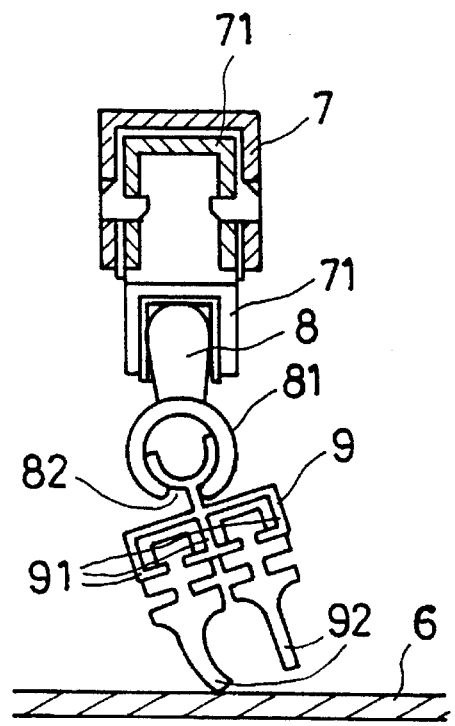

Referring to FIGS. 3-A and 3-B, when the windshield wiper is reciprocated to move the rubber blade 5 leftwards and rightwards over the windshield, the friction plates 3 and the arms 2 are moved relative to the arm holder 1 to absorb the reaction force from the rubber blade 5, and therefore the rubber blade 5 is constantly and firmly maintained in contact with the windshield.

It is to be understood that the drawings are designed for purposes of illustration only, and are not intended as a definition of the limits and scope of the invention disclosed. For example, the rubber blade 5 may be made having a single blade edge or two blade edges respectively attached to the windshield.

I claim:

1. A windshield wiper comprising:

an elongated blade holder;

at least one elongated rubber blade coupled with said blade holder;

first and second elongated arm assemblies coupled with said blade holder, each arm assembly comprising at least one elongated arm having a coupling portion thereon intermediate its ends, each coupling portion having a pair of aligned oblong holes therein;

first and second U-shaped friction plates, each friction plate deflating spaced first and second side coupling walls, each side coupling wall has an oblong hole therein, each side coupling wall has an inner and outer surface wherein the inner surfaces face one another, each side coupling wall has a peripheral flange projecting from the inner surface which extends around the oblong hole therein, said first friction plate is coupled with said first arm assembly, wherein said flanges thereof are received within the associated aligned holes, respectively, and the second friction plate is coupled with said second arm assembly, wherein said flanges thereof are received within the associated aligned holes, respectively;

an elongated arm holder having first and second ends, each end having a pair of aligned pivot holes therein:

first and second pivot pins, said first pivot pin passing through the holes in the first arm assembly, the first friction plate and the first end of the arm holder to secure the first arm assembly with the arm holder for both pivotal movement and swingable movement which is different from said pivotal movement, said second pivot pin passing through the holes in the second arm assembly, the second friction plate and the second end of the arm holder to secure the second arm assembly with the arm holder for both pivotal movement and swingable movement which is different from said pivotal movement.

* * * * *